Aug. 23, 1949.  G. O. KIMMELL  2,479,625
SPRAY EXTRACTOR
Filed May 15, 1948  2 Sheets-Sheet 1
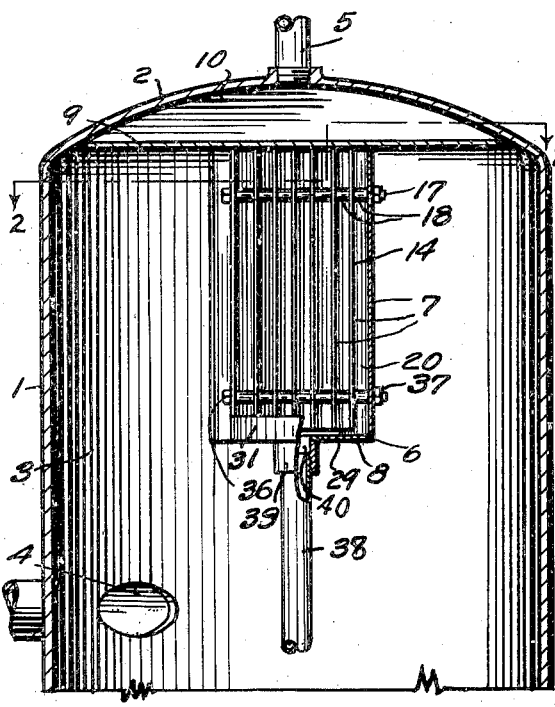
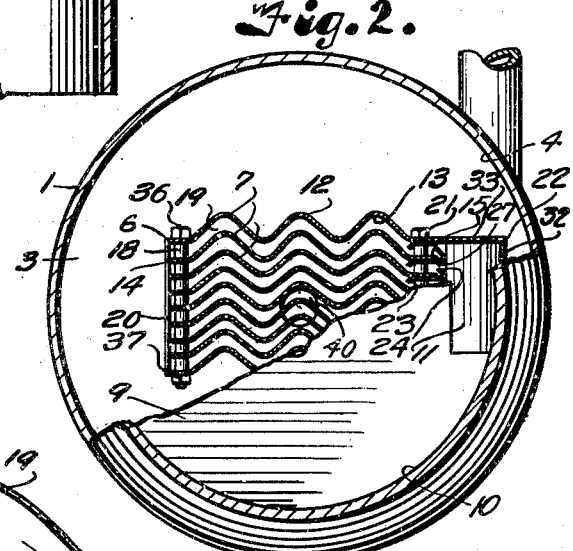
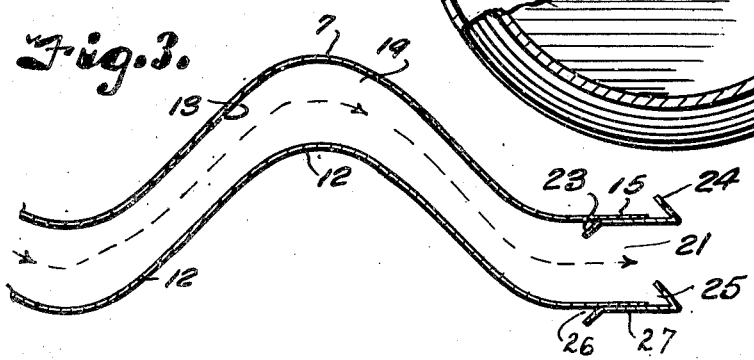
Inventor
Garman O. Kimmell
By
Fishburn + Mullendore
Attorneys

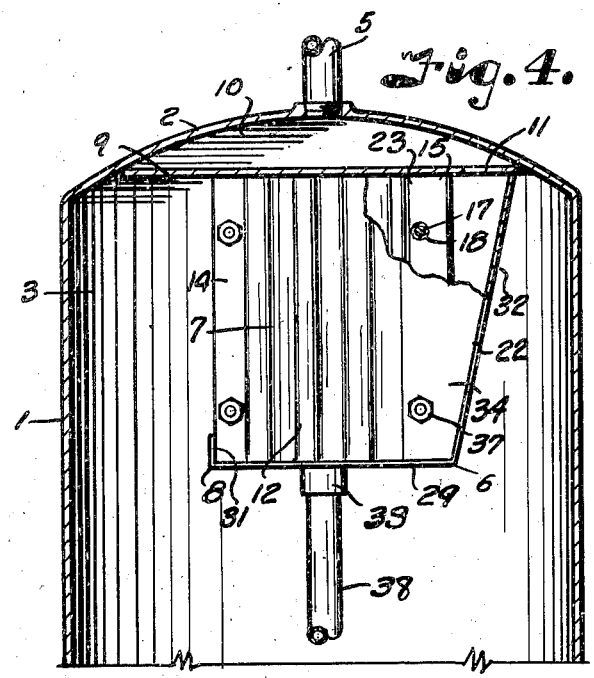

Patented Aug. 23, 1949

2,479,625

UNITED STATES PATENT OFFICE 2,479,625

SPRAY EXTRACTOR

Garman O. Kimmell, Oklahoma City, Okla., assignor to Black, Sivalls & Bryson, Inc., Kansas City, Mo., a corporation of Delaware Application May 15, 1948, Serial No. 27,332

2 Claims. (Cl. 183—79)

This invention relates to spray extractors for removing liquid particles from gas streams, for example, gas discharged from an oil and gas separator. Spray extractors of this character are usually contained within the gas separating chamber of a separator and comprise a series of laterally spaced plates to provide flow passageways therebetween in which are mounted a plurality of alternating restricted ports for causing the gas to move in tortuous streams. Such spray extractors to be efficient for a given capacity must be relatively large and require considerable space within the separator. Moreover, the pulsating flow or pressure drops in the gas passing through the restricted ports cause destructive vibration of the spray extractor. The relatively large amount of material and involved assembly of the plates and fins result in an expensive structure. The structure is also subject to stoppages in the restricted passageways and a relatively high pressure drop between the inlet and outlet sides thereof.

Therefore, the principal objects of the present invention are to provide a spray extractor of simple, light-weight and compact construction that may be assembled and sold at less cost; to provide a spray extractor having a substantially reduced pressure drop between the inlet and outlet sides and which is free from restrictions causing flow stoppage and vibration; and to provide a spray extractor having substantial efficiency and which is of relatively small size for a given flow capacity.

In accomplishing these and other objects of the invention hereinafter pointed out, I have provided improved structure, the preferred form of which is illustrated in the accompanying drawings wherein:

Fig. 1 is a vertical section through the upper portion of an oil and gas separator equipped with a spray extractor constructed in accordance with the present invention.

Fig. 2 is a horizontal section on the line 2—2 of Fig. 1.

Fig. 3 is a diagrammatic view of two adjacent plates of the extractor showing the sinusoidal flow of gas therethrough.

Fig. 4 is a section similar to Fig. 1 but taken at right angles thereto, a part of the side wall of the spray extractor being broken away to better illustrate the interior construction.

Fig. 5 is a fragmentary perspective view of the plates of the extractor, particularly illustrating the mounting thereof to form the sinusoidal passageways.

Referring more in detail to the drawings:

While spray extractors constructed in accordance with the present invention are adapted for use in various apparatus handling gaseous fluids, I have illustrated and described the invention adapted in an oil and gas separator for use in removing liquid particles from the gas after separation from the oil. The separator illustrated is of conventional construction and includes a cylindrical shell 1 ordinarily supported on end and having a closed head 2 to form a gas separating chamber 3 above a tangential inlet 4. An oil and gas flow is discharged into the separator to effect centrifugal separation of the gaseous content from the liquid of the flow. The liquid gravitates to the bottom of the separator and the gas rises to the top of the chamber 3 for discharge through a pipe 5 that extends through the head of the separator. The flow into the separator is such as to cause the separated gas to retain a quantity of entrained liquid particles. It is therefore necessary to provide a spray extractor 6 capable of extracting the liquid.

The spray extractor of the present invention includes a series of corrugated plates 7 carried above bottom 8 and which are connected at their top edges with a horizontal partition 9 dividing the gas separating space from an upper gas outlet chamber 10 that connects with the extractor through a port 11. The plates 7 are of general rectangular form and have vertically arranged corrugations 12 extending from the lower to the upper edges thereof for forming a sinusoidal surface 13 extending transversely of the plates. The plates are positioned with the corrugations in aligning registry so that the corrugation on one plate extends slightly within the corrugations of an adjacent plate as shown in Fig. 2. The terminal edges 14 and 15 of the respective plates are provided adjacent the upper and lower corners of the plates with apertures 16 for passing rods 17. Sleeved on the rods between the respective plates are tubular spacers 18 for maintaining fixed spacing of the plates and form a plurality of transverse sinusoidal passageways 19.

The spaces between the marginal edges 14 provide vertical inlets 20 to the passageways and the spaces between the edges 15 form outlets 21 to a manifold 22. In some instances it may be desirable to provide the outlets with fins 23 and 24 arranged in staggered relation and extending vertically and inwardly of the passageways forming substantially V-shaped pockets 25 and 26 assuring entrapment of any liquid particles that may have been carried through the passageways. In order to conveniently support the fins, the fins 23 for one side of one passageway and fins 24 for the opposite side of adjacent passageway are connected by webs 27 having apertures registering with the apertures 16 whereby the webs are adapted to be threaded on and supported by the rods 17 at the outlet side of the extractor. The webs engaging between the ends of the spacing sleeves and the adjacent sides of the plates are best shown in Fig. 5. The panlike bottom 8 has a plate portion 29 provided with an upturned flange 31 to prevent any liquid separated between the plates from backflowing into the gas separating space and the opposite end of the plate extends upwardly at an angle to include the outlet 11 and form a wall 32 that is connected with the partition 9 and with extensions 33 and 34 of the outer plates to form the manifold 22. The rods 17 may comprise bolts having heads 36 at one end and nuts 37 at the other whereby the parts of the spray extractor are clamped together in assembly upon tightening of the nuts. The liquid eliminated in the spray extractor drains to the bottom of the separator through a duct 38 that is connected in a collar 39 encircling a drain opening 40 in the bottom 29.

In using the spray extractor, the gas separated within the separating chamber flows through the inlets of the sinusoidal passageways and follows a sine curve of an amplitude corresponding to the depth of the corrugations to cause sufficient change in direction necessary for releasing the liquid particles and to assure contact of the gas with the surfaces of the plates. The separated liquid is swept by the gas into contact with the sine curve of the plate and washes downwardly to the duct 38 which carries the liquid to the liquid collecting space in the bottom of the separator. The gas streams continue their flow through the outlets and are conducted by the manifold into the gas chamber 10 through the port 11 for discharge from the separator. Any droplets which tend to be swept through the outlets of the passageways are stopped in the pockets 25 and 26 that are formed by the fins 23 and 24 so the comparatively dry gas is discharged from the separator.

It is obvious that the spray extractor may be inexpensively constructed since the tortuous passageways are formed by the corrugated plates and the manner of mounting the plates facilitates and simplifies assembly.

It is also obvious that the gas flows smoothly between the plates without setting up destructive vibration. The corrugated plates comprising walls of the passageways are in themselves extremely rigid by reason of their shape.

Pressure drops between the inlet and outlet sides of the extractor are relatively low since the flow is continuously uniform. The structure results in a relatively small unit, conserves space within the separator and reduces susceptibility to corrosion by absence of the baffles, fins and the like ordinarily used in spray extractors. The structure also contributes to a lower tendency to plug up since any solids can easily wash down the corrugated plates.

What I claim and desire to secure by Letters Patent is:

1. In a liquid and gas separator having a gas separating space, a partition extending across and forming a closure for the top of said space and having an opening therethrough for outlet of separated gas, a spray extractor in said gas separating space comprising a plurality of vertical plates in spaced face-to-face arrangement and having a shape to provide tortuous passages therebetween, said plates having top edges in contact with the under side of the partition and vertical edges defining inlets and outlets for said passages, said vertical edges at the outlets of said passages being disposed at one side of said outlet opening of the partition, spacing means between said plates to maintain said spacing, extensions on the outermost plates at sides of the outlet opening, a bottom extending under lower edges of said plates and having an upwardly extending wall portion connected with said extensions and with said partition at the side of the outlet opening opposite the outlets of the passages, and a liquid discharge duct connected with said bottom for discharging liquid separated in said passages.

2. In a liquid and gas separator having a gas separating space, a partition extending across end forming a closure for the top of said space and having an opening therethrough for outlet of separated gas, a spray extractor in said gas separating space comprising a plurality of vertical plates in spaced face-to-face arrangement and having a shape to provide tortuous passages therebetween, said plates having top edges in contact with the under side of the partition and vertical edges defining inlets and outlets for said passages, said vertical edges at the outlets of said passages being disposed at one side of said outlet opening of the partition, extensions on the outermost plates at sides of the outlet opening, a bottom extending under lower edges of said plates and having a flange portion extending across said inlet and having an upwardly extending wall portion at the opposite end and connected with said extensions and with said partition at the side of the outlet opening opposite the outlets of the passages, and a liquid discharge duct connected with said bottom for discharging liquid separated in said passages.

GARMAN O. KIMMELL.

REFERENCES CITED

The following references are of record in the file of this patent:

UNITED STATES PATENTS

| Number | Name | Date |
| --- | --- | --- |
| 1,818,994 | Kreisinger | Aug. 18, 1931 |
| 1,926,924 | Sylvan | Sept. 12, 1933 |
| 2,007,966 | Fletcher | July 16, 1935 |
| 2,058,240 | Hobbs | Oct. 20, 1936 |
| 2,088,994 | Corey | Aug. 3, 1937 |
| 2,440,860 | Kalmeyer | May 4, 1948 |